(12) United States Patent
Park et al.

(10) Patent No.: US 9,110,583 B2
(45) Date of Patent: Aug. 18, 2015

(54) DISPLAY DEVICE INTEGRATED WITH TOUCH SCREEN

(71) Applicant: LG Display Co., Ltd., Seoul (KR)

(72) Inventors: YongChan Park, Seoul (KR); TaeHwan Kim, Gyeonggi-do (KR); SangSoo Hwang, Seoul (KR); JinWoo Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 123 days.

(21) Appl. No.: 13/692,048

(22) Filed: Dec. 3, 2012

(65) Prior Publication Data

US 2014/0085222 A1    Mar. 27, 2014

(30) Foreign Application Priority Data

Sep. 27, 2012   (KR) .......................... 10-2012-0108174

(51) Int. Cl.
*G06F 3/041*    (2006.01)
*G06F 3/0488*   (2013.01)
*G06F 3/044*    (2006.01)

(52) U.S. Cl.
CPC .............. *G06F 3/0488* (2013.01); *G06F 3/044* (2013.01); *G06F 3/0412* (2013.01); *G06F 3/0416* (2013.01); *G06F 2203/04103* (2013.01)

(58) Field of Classification Search
USPC .......................................... 345/156, 173, 176
See application file for complete search history.

(56) References Cited

U.S. PATENT DOCUMENTS

| | | | |
|---|---|---|---|
| 7,859,521 B2 * | 12/2010 | Hotelling et al. | 345/173 |
| 2010/0103121 A1 * | 4/2010 | Kim et al. | 345/173 |
| 2010/0188361 A1 * | 7/2010 | Kim et al. | 345/174 |
| 2011/0227851 A1 * | 9/2011 | Oh et al. | 345/173 |
| 2012/0218199 A1 * | 8/2012 | Kim et al. | 345/173 |

* cited by examiner

*Primary Examiner* — Alexander Eisen
*Assistant Examiner* — Kebede Teshome
(74) *Attorney, Agent, or Firm* — Morgan, Lewis & Bockius LLP

(57) ABSTRACT

Disclosed is a display device integrated with a touch screen which realizes good design by decreasing a bezel width, and its driving method, wherein the device comprises a plurality of gate and data lines crossing each other on a lower substrate of a display panel; a common electrode formed in each of touch blocks, wherein the plurality of touch blocks are formed by grouping all pixels into units; a plurality of touch drive lines on the lower substrate of the display panel, wherein the touch drive line is provided in the same direction as that of the data line; and a plurality of touch sensing lines on an upper substrate of the display panel, wherein the touch sensing line is formed in the same direction as that of the gate line.

20 Claims, 11 Drawing Sheets

(A)

(B)

(A)

(B)

DISPLAY DEVICE INTEGRATED WITH TOUCH SCREEN

CROSS REFERENCE TO RELATED APPLICATIONS

This application claims the priority benefit of the Korean Patent Application No. 10-2012-0108174 filed on Sep. 27, 2012, which is hereby incorporated by reference as if fully set forth herein.

BACKGROUND

1. Field of the Invention

The present invention relates to a display device integrated with a touch screen.

2. Discussion of the Related Art

In substitution for an input device such as a mouse or a keyboard according to the related art, a touch screen (touch sensor) is widely used, wherein the touch screen facilitates to directly input information to a screen through the use of finger or pen. Thus, an application of the touch screen is gradually increased owing to an advantage of easy operation.

Recently, when the touch screen is applied to a liquid crystal display (LCD) device, the touch screen is provided inside a liquid crystal panel so as to obtain slimness.

FIG. 1 illustrates a display device integrated with a touch screen according to the related art, which shows a problem related with the increase of bezel width due to a touch drive line routed in a non-display area.

Referring to FIG. 1, the display device integrated with the touch screen according to the related art includes a liquid crystal panel with a display area (active area) 10 for displaying an image, and a non-display area 20; and a driving circuit for driving the liquid crystal panel.

In a lower side of the non-display area 20, there is a data driver 30. Also, a timing controller 70 is provided on a printed circuit board (PCB) 50. The data driver 30 and the timing controller 70 may be connected with each other by the use of flexible printed circuit (FPC) 40.

Also, a touch driver 60 for a touch-sensing driving is formed on the PCB 50. A touch drive line 80 is vertically routed in each of the left and right sides of the liquid crystal panel. The touch drive line 80 and the touch driver 60 may be connected with each other by the use of FPC 40.

FIGS. 2 and 3 illustrate an arrangement structure of the touch drive line 80 and a touch sensing line 90 in the display device integrated with the touch screen according to the related art.

Referring to FIGS. 2 and 3, in case of the display device integrated with the touch screen, a common electrode on a lower substrate (TFT array substrate) may be used for a displaying function, and furthermore may be used as a touch electrode. In this case, a plurality of touch blocks may be formed by grouping the common electrodes according to a unit of plural pixels.

In order to sense a touch position, the touch blocks of a driving region 12 may be connected in the X-axis direction by the touch drive line 80, and the touch blocks of a sensing region 14 may be connected in the Y-axis direction by the touch sensing line 90.

The touch drive line 80 may be formed at the same layer as a gate line, and simultaneously provided in the same direction as the gate line. The touch drive line 80 may be connected with the common electrode of the driving region 12 through a contact (CNT). The touch sensing line 90 may be formed at the same layer as a data line 92, and simultaneously provided in the same direction as the data line 92. Under the condition that an insulating layer is interposed between the data line 92 and the touch sensing line 90, the data line 92 and the touch sensing line 90 are overlapped with each other. Thus, the driving region 12 and the sensing region 14 are separated from each other, whereby the driving region 12 and the sensing region 14 are not brought into contact with each other.

As shown in FIG. 3, the touch sensing line 90 and the data line 92 are formed at the same layer, and simultaneously provided in the same direction in parallel. In this case, the touch sensing line 90 and the common electrode of the sensing region 14 may be connected through the contact (CNT).

In the aforementioned display device integrated with the touch screen according to the related art, the common electrodes are connected in the X-axis direction; and the touch drive line 80 applied with a touch driving signal is vertically routed in the periphery of the display area (active area) 10.

Due to a line width of the touch drive lines 80 and an interval between the lines, each of the left and right sides of the non-display area 20 is increased in width, whereby a bezel width is increased in each of the left and right sides of the LCD device.

In order to obtain great immersion and good design of the display device, a method for decreasing the bezel width has been studied. However, since the touch drive line 80 is routed in the non-display area, there is a limitation in decreasing the bezel width.

Also, the touch sensing lines 90 are positioned among the touch drive lines 80, whereby the common electrode is divided therein. In the region where the common electrode is divided, liquid crystal is influenced by a coupling capacitance between the data line 92 and the pixel electrode, thereby causing a problem of light leakage.

Also, the touch sensing lines 90 are positioned among the touch drive lines 80, whereby a block dim phenomenon occurs between the driving region 12 and the sensing region 14.

SUMMARY

Accordingly, the present invention is directed to a display device integrated with a touch screen that substantially obviates one or more problems due to limitations and disadvantages of the related art.

An aspect of the present invention is to provide a display device integrated with a touch screen which realizes good design by decreasing a bezel width.

Another aspect of the present invention is to provide a display device integrated with a touch screen which improves a touch sensing efficiency without lowering a picture quality.

Another aspect of the present invention is to provide a display device integrated with a touch screen which prevents a block dim phenomenon.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device integrated with a touch screen comprising: a plurality of gate and data lines crossing each other on a lower substrate of a display panel; a common electrode formed in each of touch blocks, wherein the plurality of touch blocks are formed by grouping all pixels into units; a plurality of touch drive lines on the lower substrate of the display panel, wherein the touch drive line is provided in the same direction as that of the data line; and a plurality of touch sensing lines on an upper substrate of the display panel, wherein the touch sensing line is formed in the same direction as that of the gate line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
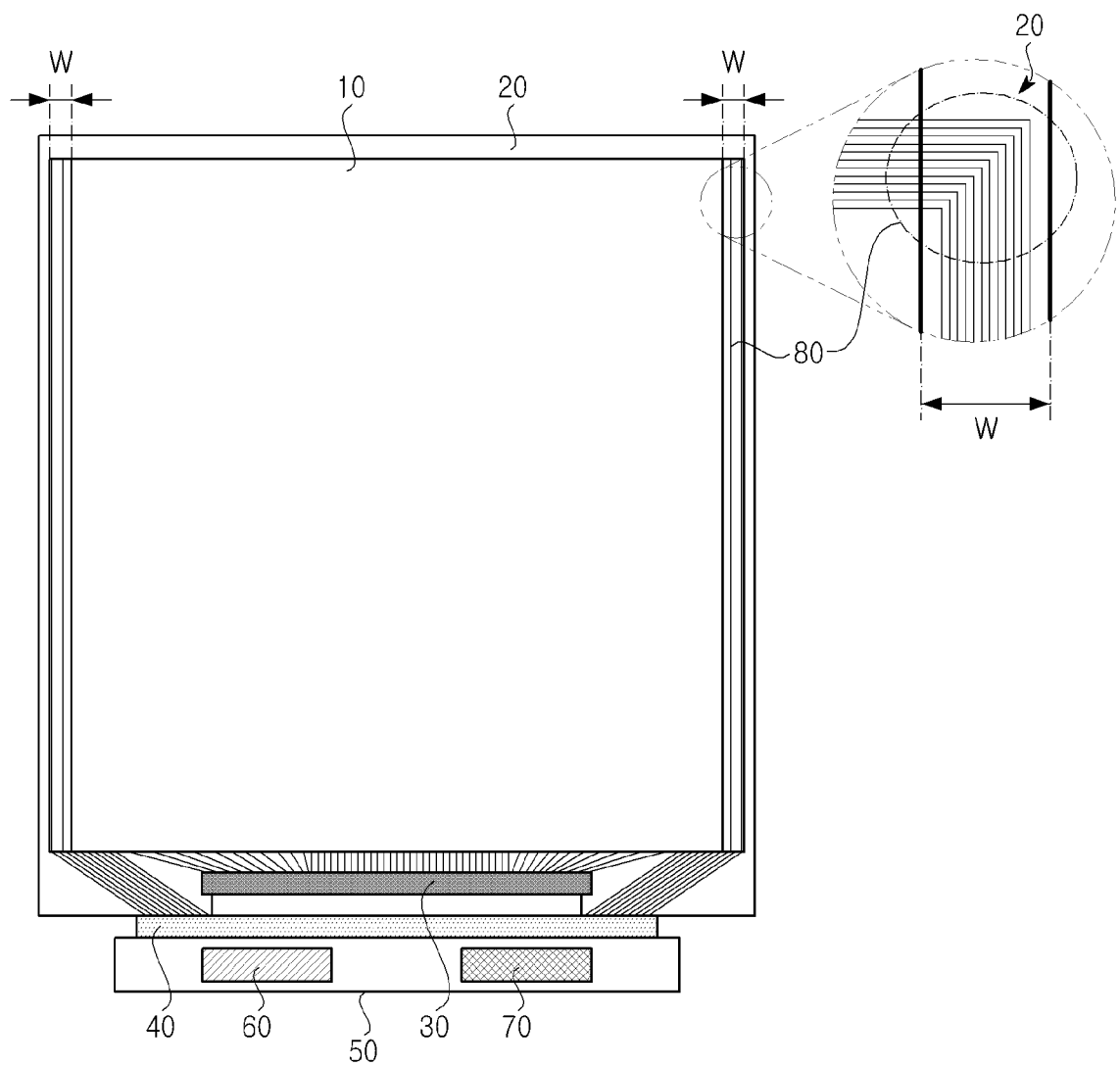
FIG. 1 illustrates a display device integrated with a touch screen according to the related art, which shows a problem related with the increase of bezel width due to a touch drive line routed in a non-display area.
Figure 2:
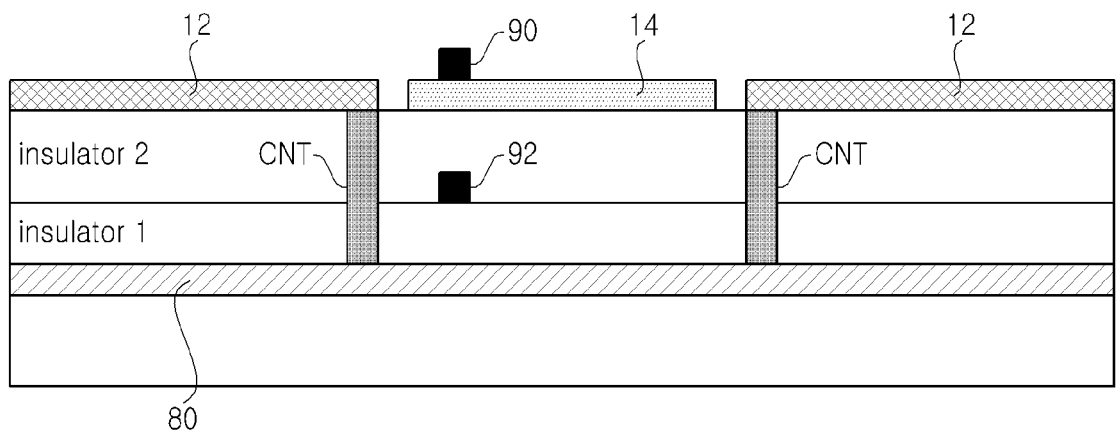
FIGS. 2 and 3 illustrate an arrangement structure of a touch drive line and a touch sensing line in the display device integrated with the touch screen according to the related art.
Figure 2:
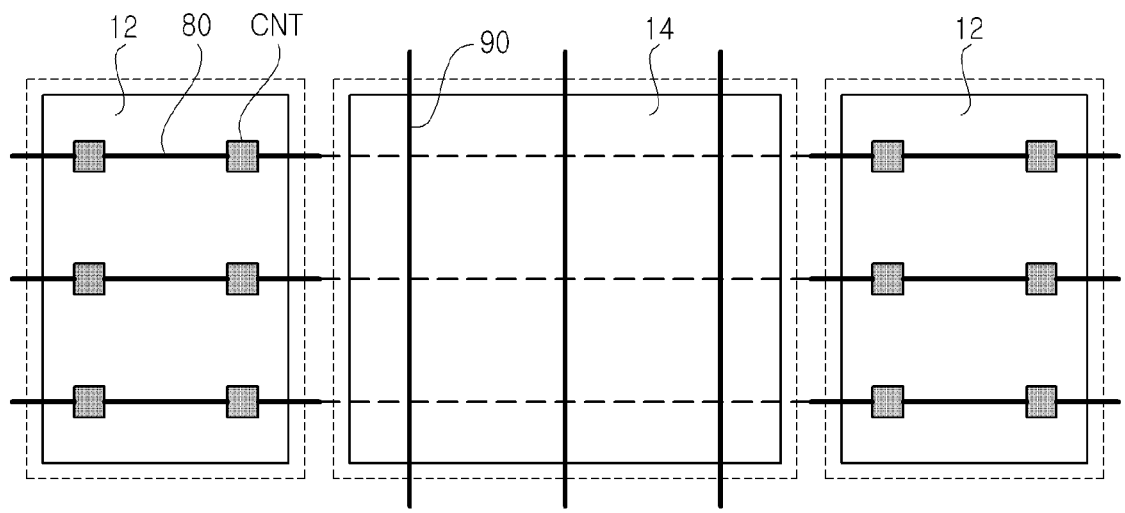
Figure 3:
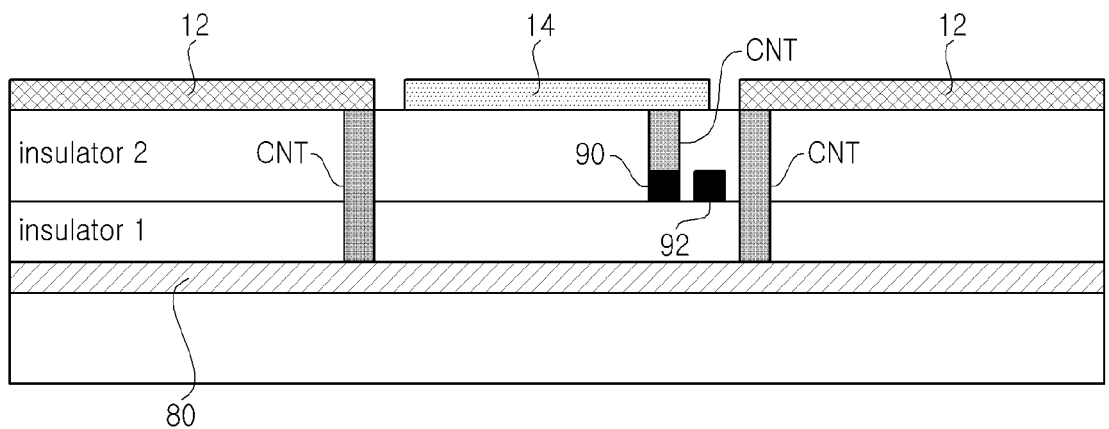
Figure 3:
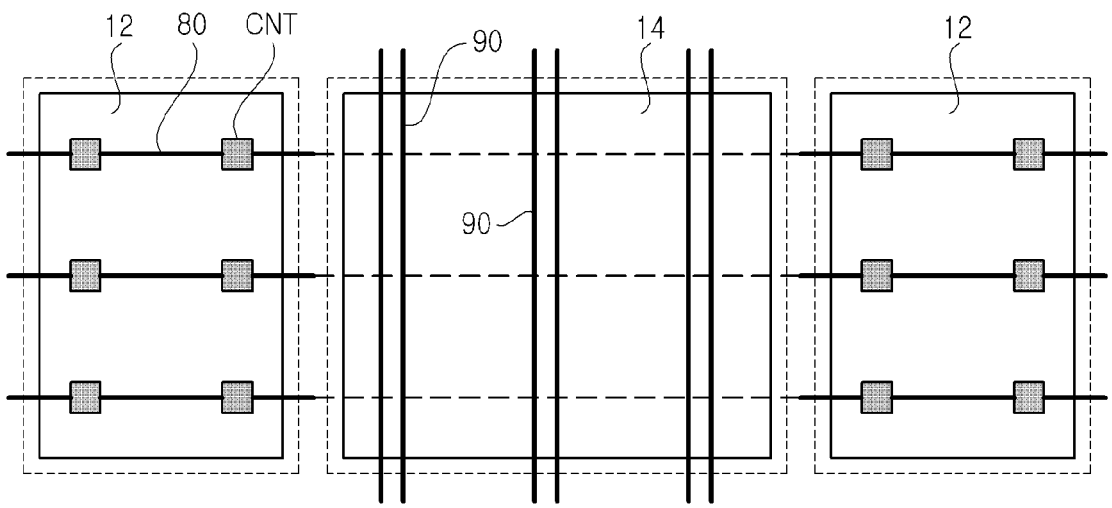

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device integrated with a touch screen according to the embodiment of the present invention and its driving method will be described with reference to the accompanying drawings.

On explanation about the embodiments of the present invention, if it is mentioned that a first structure (electrode, line, wiring, layer, contact) is positioned 'on or above' or 'under or below' a second structure, it should be understood that the first and second structures are brought into contact with each other, or a third structure is interposed between the first and second structures.

Before a detailed explanation with reference to the accompanying drawings, various modes of LCD device will be shown briefly. Based on a method for controlling alignment of liquid crystal layer, the LCD device may be classified into Twisted Nematic (TN) mode, Vertical Alignment (VA) mode, In-Plane Switching (IPS) mode, Fringe Field Switching (FFS) mode, and etc.

In case of the TN mode and VA mode among the above modes, a pixel electrode is formed on a lower substrate, and a common electrode is formed on an upper substrate (color filter array substrate), whereby the alignment of liquid crystal layer is controlled by a vertical electric field.

In case of the IPS mode and FFS mode among the above modes, pixel and common electrodes are formed on a lower substrate, and the alignment of liquid crystal layer is controlled by a horizontal electric field formed between the pixel and common electrodes.

In case of the IPS mode, the pixel and common electrodes are alternately arranged in parallel so that an in-plane electric field parallel to the substrates occurs between the pixel and common electrodes, to thereby control the alignment of liquid crystal layer. In case of the IPS mode, the alignment of liquid crystal layer is not controlled in the upper portions of the common electrode and pixel electrode, so that a light transmittance is lowered in the upper portions of the common electrode and pixel electrode.

The FFS mode has been designed to overcome disadvantages of the IPS mode. In case of the FFS mode, the pixel and common electrodes are formed with a predetermined interval by an insulating layer interposed therebetween. In this case, one of the pixel and common electrodes is formed in a plate shape or pattern, and the other is formed in a finger shape. Thus, the alignment of liquid crystal layer is controlled by a fringe field occurring between the pixel and common electrodes.

The display device according to the present invention may be applied to any one of the vertical electric field mode (TN mode, VA mode) and the horizontal electric field mode (IPS mode, FFS mode) without limitation. Herein, the display device of the IPS mode according to the present invention is illustrated and described with reference to the following drawings.

Figure 4:
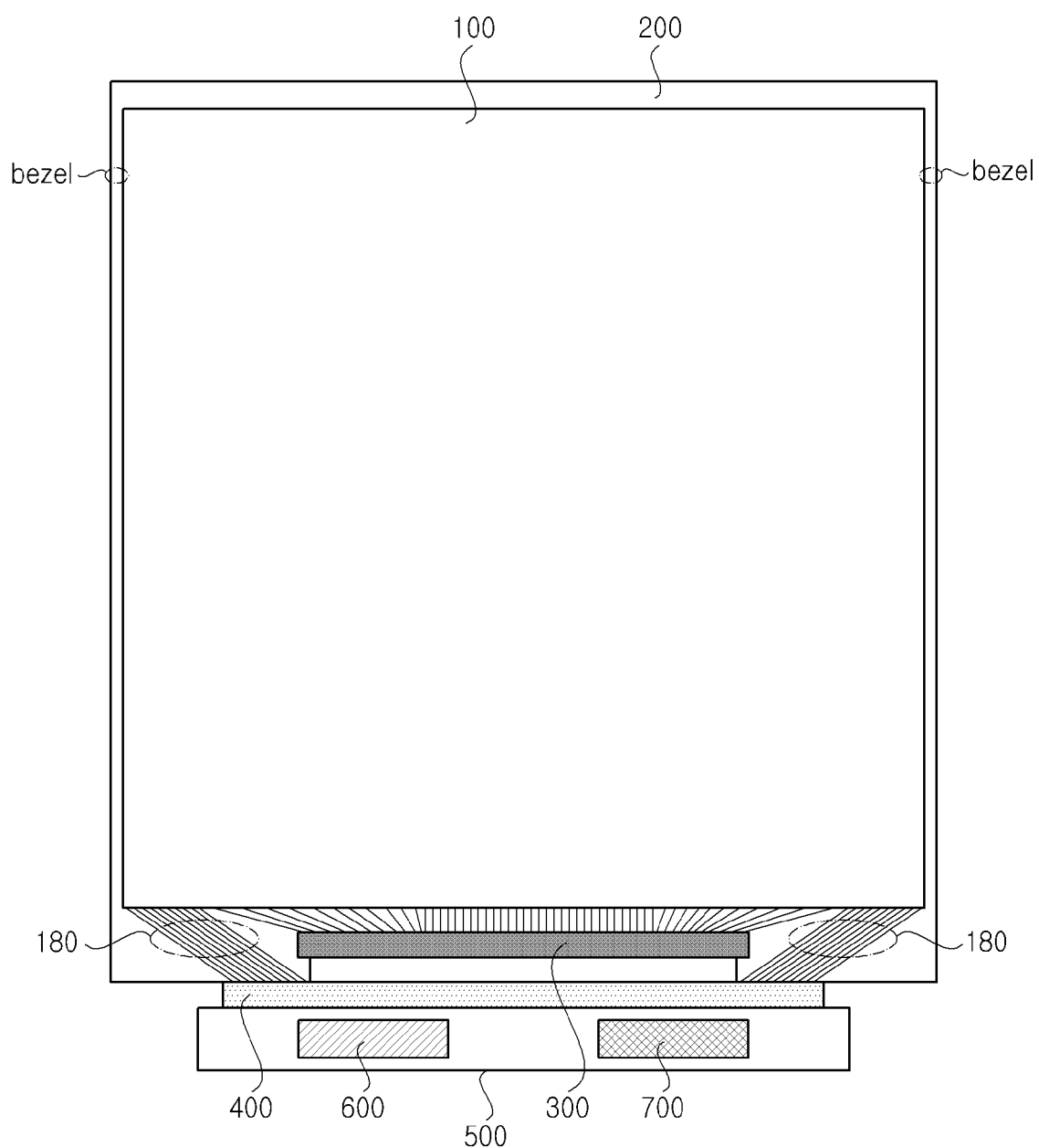
FIG. 4 illustrates a display device integrated with a touch screen according to the embodiment of the present invention.
Figure 5:
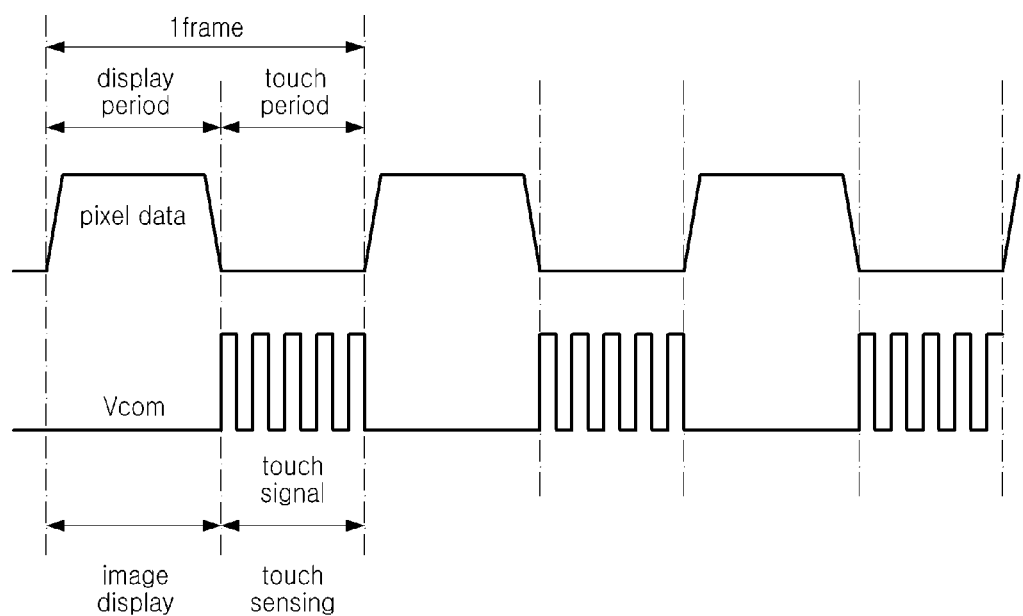
FIG. 5 illustrates a driving method of the display device integrated with the touch screen according to the embodiment of the present invention.

FIG. 4 illustrates a display device integrated with a touch screen according to the embodiment of the present invention. FIG. 5 illustrates a driving method of the display device integrated with the touch screen according to the embodiment of the present invention.

Referring to FIG. 4, the display device integrated with the touch screen according to the embodiment of the present invention includes a liquid crystal panel provided with the touch screen therein, a backlight unit, and a driving circuit. In FIG. 4, the backlight unit is not shown.

The liquid crystal panel includes a display area (active area) 100 and a non-display area 200. In the display area 100, a plurality of pixels for displaying an image may be arranged in a matrix configuration. In addition, a touch drive line (first touch line) 180 and a touch sensing line (second touch line) for sensing a user's touch position are provided in the display area 100.

The liquid crystal panel includes an upper substrate, a lower substrate, and a liquid crystal layer interposed between the lower and upper substrates. On the upper substrate, there are red, green and blue color filters so as to display a full-color image. Between each of the color filters, there is a black matrix for division of the pixel. Also, the plurality of touch sensing lines for sensing a touch are formed on the upper substrate.

On the lower substrate, there are the plurality of pixels arranged in the matrix configuration. Each of the pixels is defined by crossing gate and data lines each other. Also, a thin film transistor (TFT) and a storage capacitor (Cst) are formed every crossing region of the gate and data lines.

For the description of the embodiment of the present invention, an oxide TFT functions as a switching device so as to drive a plurality of sub-pixels.

The liquid crystal panel does not emit light in itself. Thus, the light emitted from the backlight unit is supplied to the liquid crystal panel, to thereby image an image. The backlight unit includes a plurality of light sources for generating light; and an optical member for guiding the light, generated in the light sources, toward the liquid crystal panel.

The driving circuit includes a gate driver (not shown), a data driver (D-IC) 300, a timing controller (T-con) 700, and a data driver 600. In this case, the driving circuit may be totally or partially formed in the liquid crystal panel by COG (Chip On Glass) or COF (Chip On Flexible Printed Circuit, Chip On Film).

For example, the gate driver and the data driver 300 are formed on the liquid crystal panel, and the gate driver and the data driver 300 are connected with the timing controller 700 on a printed circuit board (PCB) by a flexible printed circuit (FPC) 400.

The touch driver 600 is connected with the touch drive lines 180, formed on the lower substrate of the liquid crystal panel, by the FPC 400 in the periphery of the display area.

Also, although not shown in FIG. 4, the touch sensing line (not shown) may be formed on the upper substrate of the liquid crystal panel, and the touch sensing line formed on the upper substrate of the liquid crystal panel may be connected with the touch driver 600 by an additional FPC. Meanwhile, the touch sensing line may be connected with a pad of the lower substrate, and the pad may be connected with the touch driver 600.

The timing controller 700 serves as a main controller of the display device, wherein the timing controller 700 controls driving of the gate driver, the data driver and the touch driver.

The timing controller 700 converts video data input from the external into digital video data (R, G, B) as a frame unit by the use of vertical synchronous signal (V-sync), horizontal synchronous signal (H-sync) and clock signal (CLK), and then supplies the converted video data to the data driver 300.

Also, the timing controller 700 generates a gate control signal (GCS) for controlling the gate driver by the use of vertical synchronous signal (V-sync), horizontal synchronous signal (H-sync) and clock signal (CLK), and then supplies the generated gate control signal (GCS) to the gate driver.

Also, the timing controller 700 generates a data control signal (DCS) for controlling the data driver 300, and then supplies the generated data control signal (DCS) to the data driver 300.

In this case, the data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

The gate driver generates a scan signal (gate driving signal) for driving the TFT formed in each of the pixels on the basis of the gate control signal (GCS) supplied from the timing controller 700.

The gate driver sequentially supplies the generated scan signal to the plurality of gate lines formed in the liquid crystal panel during a frame period. Thus, the TFT formed in each of the pixels is driven by the scan signal, whereby the pixel is switched.

The data driver 300 converts the digital video data (R, G, B) supplied from the timing controller 700 into an analog video signal, that is, data voltage. At a point of time when the TFT formed in each of the pixels is turned-on, the data driver 300 supplies the data voltage to the plurality of data lines formed in the liquid crystal panel on the basis of the of the data control signal (DCS) supplied from the timing controller 700.

The touch driver 600 supplies a touch driving signal for sensing a touch to a touch electrode formed in the liquid crystal panel. In this case, the touch electrode may use a structure formed on the lower substrate of the liquid crystal panel.

In the display device integrated with the touch screen according to the embodiment of the present invention, the common electrode formed on the lower substrate may be used for a displaying function, and furthermore may be used as the touch electrode.

In this case, a plurality of touch blocks may be formed by grouping the common electrodes according to a unit of plural pixels. In order to sense a touch position, the plurality of touch blocks are connected through the plurality of touch drive lines 180. Also, the touch driver 600 supplies the touch driving signal to the plurality of touch drive lines 180.

Referring to FIG. 5, the display device according to the embodiment of the present invention controls transmittance of light passing through the liquid crystal layer according to the data voltage applied to pixel electrodes of the pixels, and a common voltage (Vcom) applied to the common electrode during a display period of 1 frame, to thereby displaying an image based on a video signal.

For example, the video data, that is, data voltage is supplied to the data lines by a unit of 1 horizontal line according to a data enable (DE) signal during the display period. Thus, the data voltage is supplied to the pixel electrode during a period for turning on the TFT 110. Also, the common voltage (Vcom) is supplied to the common electrode.

Meanwhile, during the non-display period, the common electrode is driven as the touch electrode, to thereby sense a change of capacitance according to a user's touch. A touch position may be sensed by comparing a touch capacitance according to a user's touch with a reference capacitance. That is, during the non-display period, the common electrode is supplied with the touch driving signal for sensing a touch, whereby the common electrode is driven as the touch electrode.

For example, if the common electrode is used as the touch electrode during the non-display period, the touch driving signal for sensing a touch is supplied to the touch electrode.

When the touch driving signal is supplied to the common electrode driven as the touch electrode, the capacitance formed in the touch electrode is changed by a user's touch. In this case, the touch driver 600 compares the touch sensing signal applied through the plurality of sensing lines formed on the upper substrate of the liquid crystal panel, that is, the capacitance formed in the touch electrode with the reference capacitance, thereby sensing whether or not there is a touch, and sensing a touch position.

For example, it is possible to sense whether or not there is a touch, and to sense a touch position during a period of a reference signal (blank signal) for dividing preceding and following frames.

Also, start and end points for sensing a user's touch position may be determined based on a vertical synchronous signal (V-sync); and sensing whether or not there is a touch and sensing a touch position may be performed during a vertical blank (V-blank) for dividing the preceding and following frames.

Figure 6:
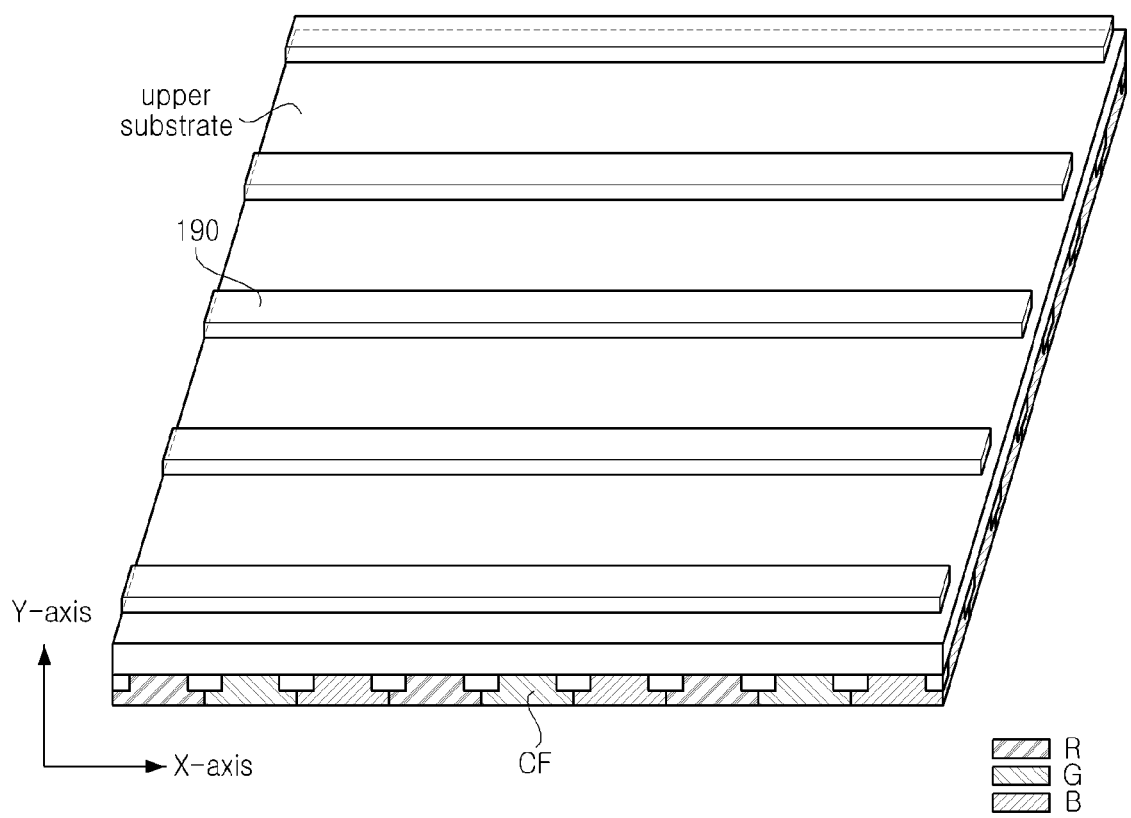
FIGS. 6 and 7 illustrate an arrangement structure of touch sensing line in the display device integrated with the touch screen according to the embodiment of the present invention.
Figure 7:
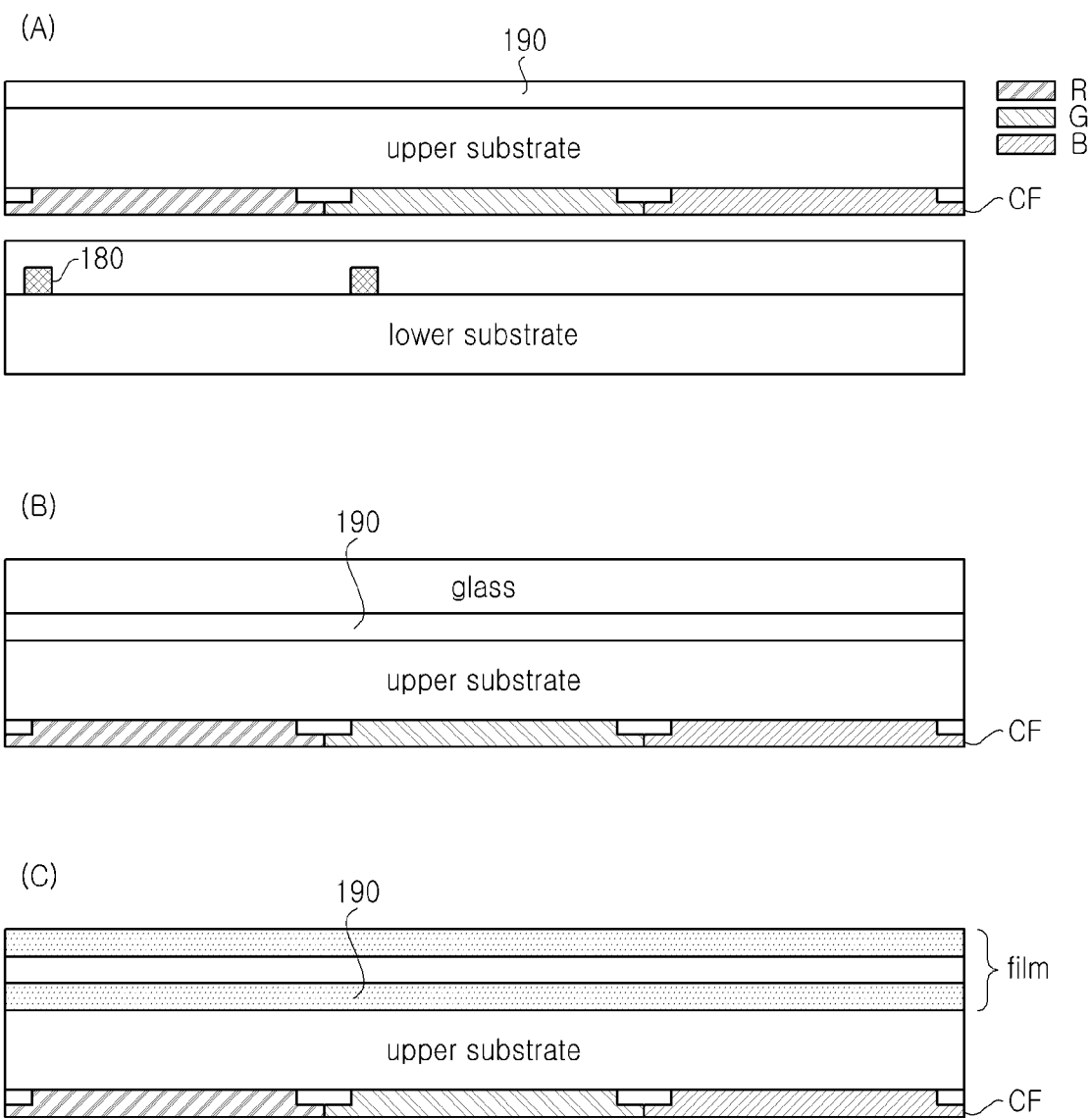

FIGS. 6 and 7 illustrate an arrangement structure of touch sensing line in the display device integrated with the touch screen according to the embodiment of the present invention.

Referring to FIGS. 6 and 7(A), the plurality of touch sensing lines 190 are formed on the upper substrate, and more particularly, on the color filters (CF) of the upper substrate in the liquid crystal panel of the display device integrated with the touch screen according to the embodiment of the present invention. In this case, the plurality of touch sensing lines 190 may be formed in parallel, and may be provided in the same direction as that of the gate line on the lower substrate, that is, the X-axis direction.

As the plurality of touch sensing lines 190 are positioned in the surface displayed with an image, the plurality of touch sensing lines 190 are formed of a transparent conductive material, for example, Indium Tin Oxide (ITO) or Indium Zinc Oxide (IZO).

In addition to the above structure of positioning the plurality of touch sensing lines 190 on the upper substrate, as shown in FIG. 7(B), under the condition that the plurality of touch sensing lines 190 are formed under a tempered-glass substrate, the tempered-glass substrate with the plurality of touch sensing lines 190 provided thereunder may be positioned on the upper substrate.

Meanwhile, as shown in FIG. 7(C), the plurality of touch sensing lines 190 may be formed in a film type, which enables to protect the touch screen, as well as to serve a touch sensing function.

Although not shown, the plurality of touch sensing lines 190 may be connected with the touch driver 600 by the FPC.

According to another example, the touch driver 600 may be connected with the pad of the lower substrate. Then, the plurality of touch sensing lines 190 may be connected with the pad of the lower substrate, whereby the plurality of touch sensing lines 190 may be connected with the touch driver 600.

The display device integrated with the touch screen according to the embodiment of the present invention facilitates to decrease noise factors by the simplified TFT structure and process, wherein the noise factors might have bad effects on both displaying driving and touch driving. Also, the touch drive line 180 is provided in the same direction as that of the data line, that is, the vertical direction, so that it is possible to decrease a bezel width in each of the left and right sides of the liquid crystal panel.

Figure 8:
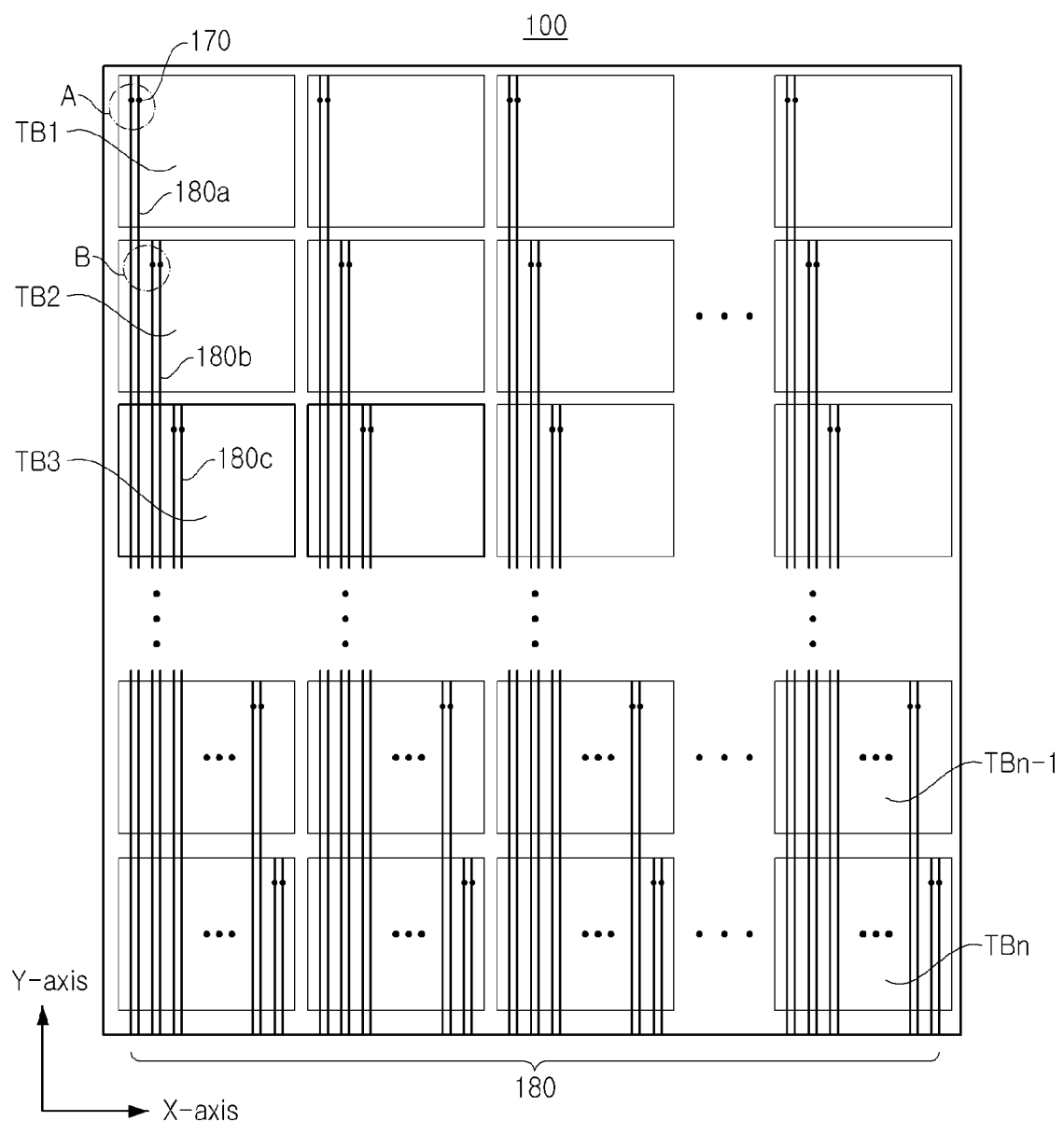
FIGS. 8 to 10 are plane views illustrating an arrangement structure of touch drive line in the display device integrated with the touch screen according to the embodiment of the present invention.
Figure 9:
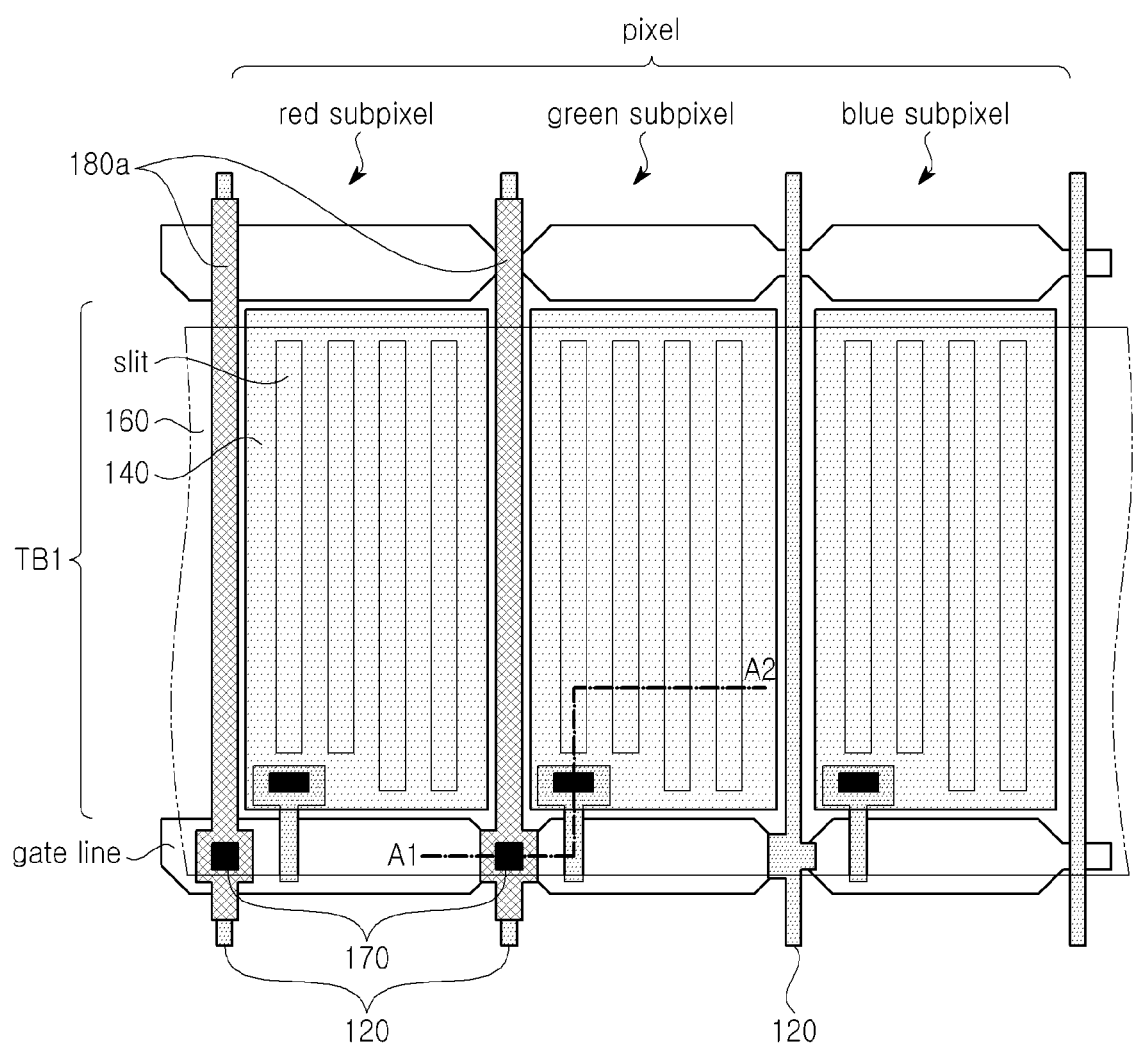
Figure 10:
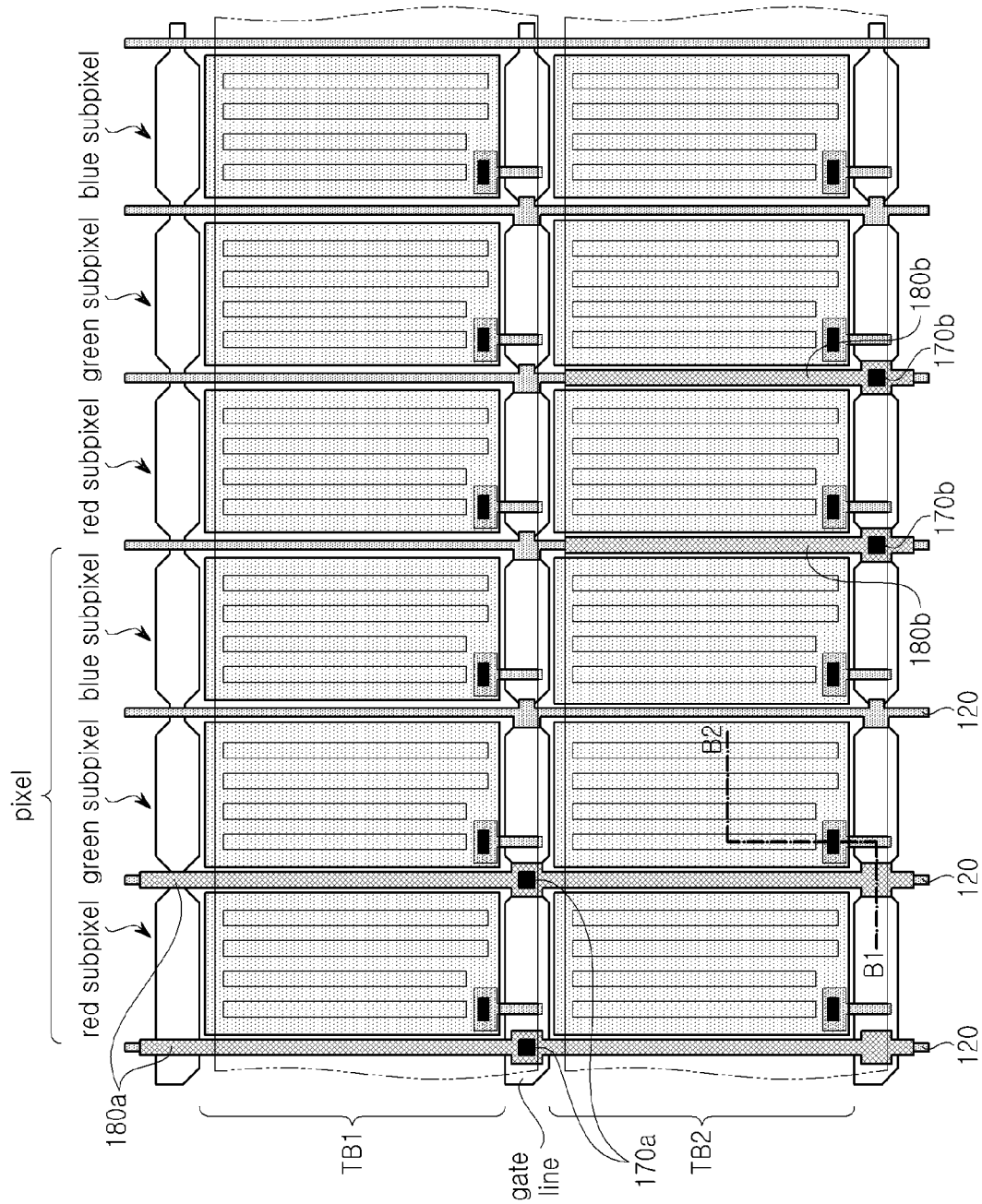
Figure 11:
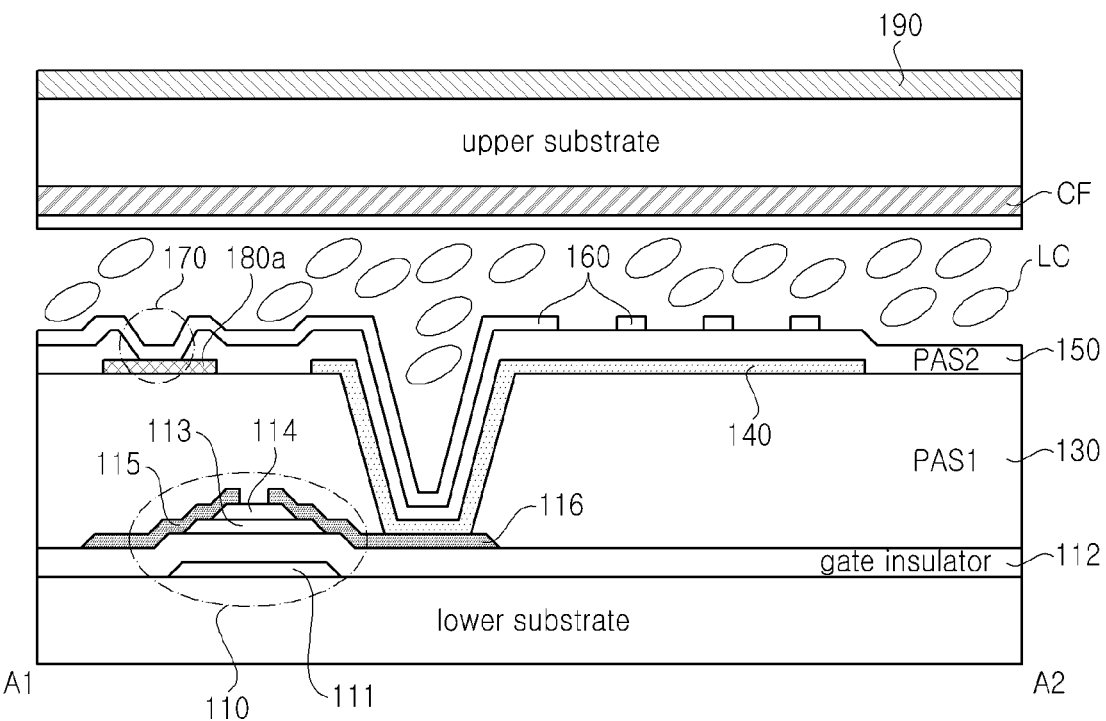
FIG. 11 is a cross sectional view along A1-A2 of FIG. 9.
Figure 12:
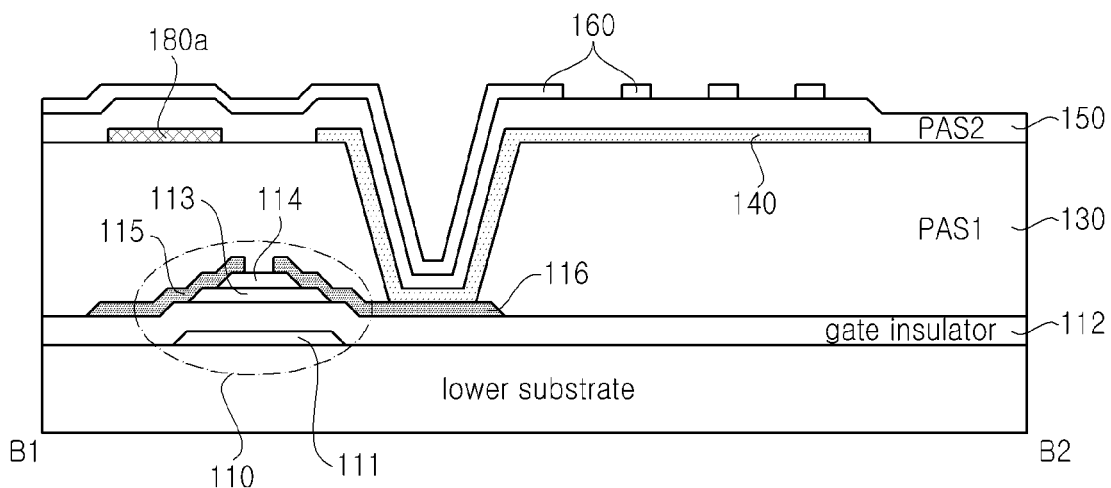
FIG. 12 is a cross sectional view along B1-B2 of FIG. 10.

FIGS. 8 to 10 are plane views illustrating an arrangement structure of touch drive line in the display device integrated with the touch screen according to the embodiment of the present invention. FIG. 11 is a cross sectional view along A1-A2 of FIG. 9. FIG. 12 is a cross sectional view along B1-B2 of FIG. 10. In FIG. 12, the upper substrate is not shown.

Referring to FIG. 8, the display device integrated with the touch screen according to the embodiment of the present includes the plurality of touch blocks (TB1~TBn) provided with the common electrodes so as to sense a user's touch. In this case, the touch block may be formed by grouping the common electrodes according to a unit of plural pixels.

The plurality of touch blocks are connected with the touch drive line 180 formed in the same direction as that of the data line. Through the touch drive line 180, the touch driving signal is applied to the plurality of touch blocks from the touch driver 600.

In this case, one touch block may be provided with the plurality of pixels. For example, one touch block may be provided with 64×64 pixels (64 pixels in a length direction, 64 pixels in a width direction). However, the number of pixels for one touch block may be changed according to the total number of pixels for the liquid crystal panel. Also, the number of touch blocks may be changed according to the size of the liquid crystal panel.

Although not shown, the gate line and the data line 120 may be formed of a single layer of a material with low resistivity, for example, argentum (Ag), aluminum (Al), copper (Cu), molybdenum (Mo), chrome (Cr) or their alloys.

Meanwhile, the gate line and the data line 120 may be formed in a multi-layered structure of at least two materials among argentum (Ag), aluminum (Al), copper (Cu), molybdenum (Mo), chrome (Cr) and their alloys.

The plurality of touch blocks are respectively connected with the different touch drive lines 180. For example, the first touch block (TB1) is connected with the first touch drive line 180a; the second touch block (TB2) is connected with the second touch drive line 180b; and the third touch block (TB3) is connected with the third touch drive line 180c.

The touch block may be connected with at least one of the touch drive lines 180. As the number of touch drive lines 180 connected with the touch block is increased, its contact area is increased so that the touch driving signal is smoothly applied to the respective touch blocks.

According to the present invention, the plurality of touch drive lines 180 are formed in each touch block. In FIG. 7, the two touch drive lines 180 are connected with one touch block.

Hereinafter, a detailed example of the arrangement structure of the touch drive line will be described with reference to FIGS. 9 to 12. FIG. 9 illustrates 'A' of FIG. 8, and FIG. 10 illustrates 'B' of FIG. 8.

As shown in FIGS. 9 and 10, the plurality of gate lines are formed in the X-axis direction, and the plurality of data lines 120 are formed in the Y-axis direction. Also, the plurality of sub-pixels are defined by crossing the gate line and the data line 120 each other, wherein the red sub-pixel, the green sub-pixel and the blue sub-pixel constitute one pixel.

As shown in FIGS. 11 and 12, the TFT 110 is formed in each of the sub-pixels. Herein, a gate 111 of the TFT 110 is connected with the gate line; a source 115 of the TFT 110 is connected with the data line 120; and a drain 116 of the TFT 110 is connected with the pixel electrode 140. Between the gate 111 and the active 113, there is a gate insulator 112. Also, an etch-stopping layer (ESL) 114 is formed on the active 113.

A first passivation layer (PAS1) 130 is formed to cover the TFT 110. The pixel electrode 140 and the touch drive line 180 are formed on the first passivation layer (PAS1) 130. In this case, the pixel electrode 140 is formed in a pixel region, and the touch drive line 180 is overlapped with the data line 120.

Then, a second passivation layer (PAS2) 150 is formed to cover the touch drive line 180 and the pixel electrode 140, and the common electrode 160 is formed on the second passivation layer (PAS2) 150. As shown in FIGS. 9 and 10, the pixel electrode 140 is formed in a plate shape inside each of the sub-pixels.

Referring to FIG. 9 illustrating 'A' of FIG. 8, the common electrode 160 is divided for each touch block. In this case, a slit is formed in the common electrode 160, whereby a fringe field is formed between the pixel electrode 140 and the common electrode 160.

The touch drive line 180 is formed in the same direction as that of the data line 120, that is, the Y-axis direction inside the display area. The common electrode 160 of the touch block and the touch drive line 180 are connected with each other by a contact portion 170.

In order to minimize the decrease of aperture ratio in the pixel by the contact between the common electrode 160 and the touch drive line 180, the contact portion 170 is formed in an overlapping region between the gate line and the data line 120.

In more detail, during a manufacturing process, an upper surface of the touch drive line 180 is exposed by etching the second passivation layer 150 from the overlapping region between the gate line and the data line 120. Then, a transparent conductive material such as ITO is coated onto the upper surfaces of the touch drive line 180 and the second passivation layer 150, to thereby form the common electrode 160. Thus, the touch drive line 180 and the common electrode 160 of the touch block are connected in the contact portion 170, whereby the touch driving signal is supplied to each touch block.

Referring to FIGS. 10 to 12, in order to increase the contact area between the touch drive line 180 and the common electrode 160 of the touch block, the two touch drive lines 180 are formed in each of the touch blocks.

In this case, the touch drive line 180 is not formed on all of the data lines 120 of the red sub-pixel, the green sub-pixel and the blue sub-pixel. The touch drive line 180 is formed on the data lines 120 of the red sub-pixel and the green sub-pixel.

A line width of the touch drive line 180 may be the same as or larger than a line width of the data line 120. As the touch drive line 180 is overlapped with the data line 120, the touch drive line 180 may be formed of an opaque metal material with high conductivity (for example, the same opaque metal material as that of the data line 120).

Meanwhile, an electric field of the sub-pixel is only marginally influenced by the touch drive line 180. A luminance of the blue sub-pixel is relatively lower than those of the red sub-pixel and the green sub-pixel.

Thus, the blue sub-pixel may be sensitive to the influence of touch drive line 180. According to the present invention, the touch drive line 180 is not formed on the data line 120 of the blue sub-pixel.

Referring to FIGS. 10 and 11 illustrating 'A' of FIG. 8, the touch drive line 180*a* of the first touch block (TB1) is connected with the common electrode 160 through the first contact portion 170*a* in the overlapping region between the gate line and the data line 120.

Meanwhile, the touch drive line 180*b* of the second touch block (TB2) is connected with the common electrode 160 through the second contact portion 170*b* in the overlapping region between the gate line and the data line 120.

Referring to FIGS. 8 to 10, the first touch block (TB1) is positioned at the uppermost region of the liquid crystal panel, and then the following touch blocks from the second touch block (TB2) to the (n)th touch block (TBn) are positioned in sequence.

Thus, the touch drive line 180*a* of the first touch block (TB1) is the longest one among the touch drive lines 180. The touch drive line 180*b* of the second touch block (TB2) has a length from the second touch block (TB2) to the (n)th touch block (TBn) except the first touch block (TB1).

Referring to FIGS. 10 to 12, in order to sense a touch in the X-axis direction and the Y-axis direction, it is necessary to separately drive the plurality of touch blocks. Thus, the touch drive line 180 connected with the corresponding touch block is not connected with the other touch blocks.

When the touch drive line connected with the (k)th touch block passes through the (k+1)th touch block, the touch drive line connected with the (k)th touch block is not connected with the (k+1)th touch block.

For example, among the plurality of touch drive lines 180, the first touch drive line 180*a* is connected with the common electrode 160 of the first touch block (TB1) among the plurality of touch blocks. Also, the first touch drive line 180*a* is electrically insulated from the common electrodes 160 of the other touch blocks except the first touch block (TB1) by the use of insulating layer (second passivation layer).

That is, the touch drive line 180*a* of the first touch block (TB1) is connected with the common electrode 160 of the first touch block (TB1), and is not connected with the common electrodes 160 of the other touch blocks.

In more detail, as shown in FIG. 12, the second passivation layer 150 is formed between the first touch drive line 180*a* connected with the common electrode 160 of the first touch block (TB1) and the common electrode 160 of the second touch block (TB2), whereby the first touch drive line 180*a* is not brought into contact with the common electrode 160 of the second touch block (TB2).

During the manufacturing process, while the second passivation layer 150 is etched and removed from the region with the contact portions 170*a* and 170*b*, the second passivation layer 150 formed in the other regions is maintained so that it functions as the insulating layer.

In the same manner as the first touch block (TB1), the touch drive line 180*b* of the second touch block (TB2) is connected with the common electrode 160 of the second touch block (TB2), and is not connected with the common electrodes 160 of the other touch blocks.

In the aforementioned display device integrated with the touch screen according to the embodiment of the present invention, under the condition that the insulating layer (second passivation layer) is interposed between the touch drive line 180 and the data line 120, the touch drive line 180 is formed on the data line 120. Also, the touch drive line 180 is formed in the same direction as that of the data line 120, that is, the Y-axis direction, so that it is possible to decrease the bezel width in each of the left and right sides of the liquid crystal panel.

Also, the touch drive line 180 is formed on the lower substrate of the liquid crystal panel. The touch sensing line 190 may be formed on the upper substrate of the liquid crystal panel, or may be formed in On-Top or Add-On type. Thus, it is possible to decrease interference of displaying driving according to the touch driving.

Especially, if the touch sensing line 190 is formed among the touch drive lines 180, a block dim phenomenon might occur. In the display device integrated with the touch screen according to the embodiment of the present invention, the touch sensing line 190 is not provided among the touch drive lines 180, to thereby prevent the block dim phenomenon.

Accordingly, the display device integrated with the touch screen according to the embodiment of the present invention enables to realize good design by decreasing the bezel width.

Also, the display device integrated with the touch screen according to the embodiment of the present invention facilitates to enhance the touch sensing function without lowering picture quality.

In addition, the display device integrated with the touch screen according to the embodiment of the present invention prevents the block dim phenomenon.

Furthermore, the display device integrated with the touch screen according to the embodiment of the present invention and its driving method facilitates to achieve high efficiency in the touch sensing.

What is claimed is:

1. A display device integrated with a touch screen, comprising:
 a plurality of gate and data lines crossing each other on a lower substrate of a display panel;

a common electrode formed in each of touch blocks, the plurality of touch blocks being formed by grouping all pixels into units;

a plurality of touch drive lines on the lower substrate of the display panel, the touch drive line being provided in the same direction as that of the data line;

a plurality of touch sensing lines on an upper substrate of the display panel, the touch sensing line being formed in the same direction as that of the gate line; and a plurality of contact portions respectively connecting each touch drive line with the common electrode, wherein the contact portion is formed directly in an overlapping region between the gate and the data line, and wherein a length of the touch drive lines is different for each touch block in the direction of the data lines.

2. The display device according to claim 1, wherein:

a common voltage is supplied to common electrodes of the plurality of touch blocks during a display period; and a touch driving signal is supplied to common electrodes of the plurality of touch blocks during a non-display period such that the common electrodes function as touch electrodes.

3. The display device according to claim 1, wherein a line width in each of the touch drive lines is the same as or larger than a line width of the data line.

4. The display device according to claim 1, wherein the plurality of touch drive lines are overlapped with the data line under the condition that an insulating layer is interposed therebetween.

5. The display device according to claim 1, wherein the plurality of touch drive lines are formed on at least one data line among the data lines of a red sub-pixel, a green sub-pixel, and a blue sub-pixel constituting one pixel.

6. The display device according to claim 1, wherein:

the plurality of touch drive lines are formed in a Y-axis direction; and the plurality of touch sensing lines are formed in an X-axis direction.

7. The display device according to claim 1, wherein:

the first touch drive line among the plurality of touch drive lines is connected with the common electrode of the first touch block among the plurality of touch blocks; and the first touch drive line is electrically insulated from the common electrodes of the other touch blocks except the first touch block.

8. The display device according to claim 1, further comprising:

a first passivation layer covering a thin film transistor; and a second passivation layer covering the touch drive line and a pixel electrode, wherein the second passivation layer insulates the touch drive line connected with the common electrode of the first touch block from the common electrodes of the other touch blocks except the first touch block.

9. The display device according to claim 1, further comprising:

a touch driver configured to:

supply a touch driving signal to the plurality of touch blocks; and sense a capacitance in the plurality of touch blocks, wherein the plurality of touch drive lines and the touch driver are connected in the periphery of display area by a flexible printed circuit (FPC).

10. The display device according to claim 1, wherein:

the plurality of touch drive lines comprise an opaque metal material; and the plurality of touch sensing lines comprise a transparent conductive material.

11. The display device according to claim 1, wherein each of the touch blocks is connected with at least two touch drive lines.

12. A display device integrated with a touch screen, comprising:

a plurality of gate and data lines crossing each other on a lower substrate of a display panel;

a common electrode formed in each of touch blocks, the plurality of touch blocks being formed by grouping all pixels into units;

a plurality of touch drive lines on the lower substrate of the display panel, the touch drive line being provided in the same direction as that of the data line;

a plurality of touch sensing lines on an upper substrate of the display panel, the touch sensing line being formed in the same direction as that of the gate line; and a plurality of contact portions respectively connecting each touch drive line with the common electrode, wherein, a plurality of first touch drive lines among the plurality of touch drive lines are disposed on the data lines of red sub-pixel, wherein a plurality of second touch drive lines among the plurality of touch drive lines are disposed on the data lines of green sub-pixel, and wherein none of the plurality of touch drive lines is disposed on the data lines of blue sub-pixel.

13. The display device according to claim 12, wherein the contact portion is formed directly in an overlapping region between the gate and the data line.

14. The display device according to claim 12, wherein a length of the touch drive lines is different for each touch block in the direction of the data lines.

15. The display device according to claim 12, wherein a line width in each of the touch drive lines is the same as or larger than a line width of the data line.

16. The display device according to claim 12, wherein the plurality of touch drive lines are overlapped with the data line underneath, and with an insulating layer interposed therebetween.

17. The display device according to claim 12, wherein:

the plurality of touch drive lines is formed in a Y-axis direction; and the plurality of touch sensing lines is formed in an X-axis direction.

18. The display device according to claim 12, wherein:

the first touch drive line among the plurality of touch drive lines is connected with the common electrode of the first touch block among the plurality of touch blocks; and the first touch drive line is electrically insulated from the common electrodes of the other touch blocks, except for the first touch block.

19. The display device according to claim 12, further comprising:

a first passivation layer covering a thin film transistor; and a second passivation layer covering the touch drive line and a pixel electrode, wherein the second passivation layer insulates the touch drive line connected with the common electrode of the first touch block from the common electrodes of the other touch blocks except the first touch block.

20. The display device according to claim 12, further comprising a touch driver configured to:

supply a touch driving signal to the plurality of touch blocks; and sense a capacitance in the plurality of touch blocks, wherein the plurality of touch drive lines and the touch driver are connected in the periphery of display area by a flexible printed circuit (FPC).

* * * * *